US008564473B2

(12) United States Patent
Bosser et al.

(10) Patent No.: US 8,564,473 B2
(45) Date of Patent: Oct. 22, 2013

(54) METHOD FOR CONSTRUCTING FOCUSED RADAR IMAGES

(75) Inventors: Luc Bosser, Rambouillet (FR); Joan Broussolle, Nanterre (FR); Julien Lafaix, Le Chesnay (FR)

(73) Assignee: Thales, Neuilly sur Seine (FR)

( * ) Notice: Subject to any disclaimer, the term of this patent is extended or adjusted under 35 U.S.C. 154(b) by 126 days.

(21) Appl. No.: 13/109,784

(22) Filed: May 17, 2011

(65) Prior Publication Data

US 2011/0285580 A1 Nov. 24, 2011

(30) Foreign Application Priority Data

May 18, 2010 (FR) ...................................... 10 02083

(51) Int. Cl.
*G01S 13/00* (2006.01)
(52) U.S. Cl.
USPC ...... 342/25 F; 342/25 R; 342/25 A; 342/179; 342/195
(58) Field of Classification Search
USPC ....... 342/25 R, 25 A, 25 B, 25 C, 25 D, 25 E, 342/25 F, 179, 195
See application file for complete search history.

(56) References Cited

U.S. PATENT DOCUMENTS

| | | | | |
|---|---|---|---|---|
| 5,343,204 A * | 8/1994 | Farmer et al. | ................ | 342/25 F |
| 6,255,981 B1 * | 7/2001 | Samaniego | ................ | 342/25 R |
| 6,603,424 B1 * | 8/2003 | Abatzoglou | ................ | 342/25 R |
| 6,781,541 B1 * | 8/2004 | Cho | ................ | 342/25 D |
| 7,145,498 B2 * | 12/2006 | Cho et al. | ................ | 342/25 R |
| 7,245,250 B1 * | 7/2007 | Kalayeh | ................ | 342/25 R |
| 7,301,495 B2 * | 11/2007 | Abatzoglou et al. | ........ | 342/25 F |
| 7,391,357 B1 | 6/2008 | Doerry et al. | | |
| 7,511,656 B2 * | 3/2009 | Callison | ................ | 342/118 |
| 7,567,198 B2 * | 7/2009 | Smith | ................ | 342/25 A |
| 7,760,128 B1 * | 7/2010 | Doerry et al. | ................ | 342/25 F |
| 7,777,665 B1 * | 8/2010 | Doerry et al. | ................ | 342/25 E |
| 7,843,377 B2 * | 11/2010 | Connell et al. | ................ | 342/25 F |
| 8,009,079 B2 * | 8/2011 | Connell et al. | ................ | 342/25 F |
| 2006/0109164 A1 * | 5/2006 | Cho et al. | ................ | 342/25 R |
| 2006/0109165 A1 * | 5/2006 | Cho | ................ | 342/25 R |
| 2007/0159376 A1 * | 7/2007 | Abatzoglou et al. | ........ | 342/25 R |
| 2007/0247461 A1 | 10/2007 | Smith | | |
| 2010/0086228 A1 * | 4/2010 | Cho et al. | ................ | 382/255 |
| 2011/0285580 A1 * | 11/2011 | Bosser et al. | ................ | 342/25 F |

FOREIGN PATENT DOCUMENTS

| | | |
|---|---|---|
| EP | 2180338 | 4/2010 |
| FR | 2924513 | 6/2009 |

OTHER PUBLICATIONS

A.W. Doerry, "Autofocus Correction of SAR Images Exhibiting Excessive Residual Migration", Radar Sensor Technology IX, Proceedings of SPIE, vol. 5788, 2005, XP040203936.

* cited by examiner

*Primary Examiner* — Jack W Keith
*Assistant Examiner* — Peter Bythrow
(74) *Attorney, Agent, or Firm* — Baker Hostetler LLP

(57) ABSTRACT

A method for constructing focused radar images includes chopping the radar illumination period into p sub-periods, two successive sub-periods overlapping temporally; choosing n successive sub-periods from among the p sub-periods, and for each of the n chosen sub-periods, performing radar acquisitions to generate an image $IM\_0_x$ of resolution $R_0$; and applying an autofocus processing to each of the n images $IM\_0_x$ generated; combining the n images so as to generate at least one new focused radar image $IM\_1_x$. The method is applied notably to the production of high-resolution SAR images with the help of an aircraft equipped with a radar antenna.

9 Claims, 11 Drawing Sheets

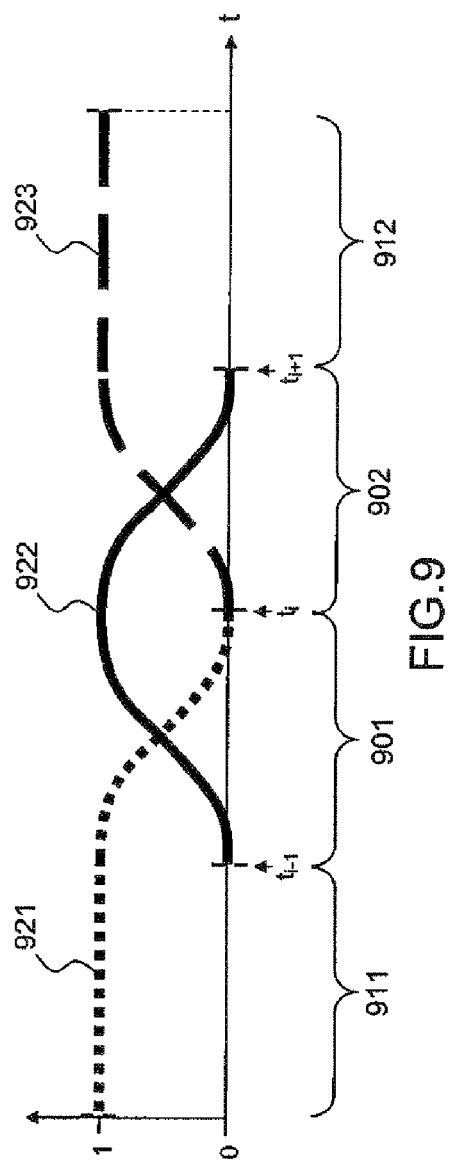
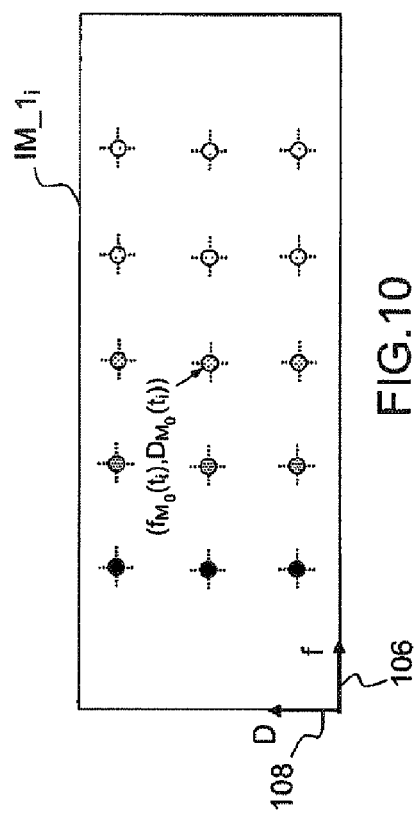

METHOD FOR CONSTRUCTING FOCUSED RADAR IMAGES

CROSS-REFERENCE TO RELATED APPLICATIONS

This application claims priority to foreign French patent application No. FR 10 02083, filed on May 18, 2010, the disclosure of which is incorporated by reference in its entirety.

FIELD OF THE INVENTION

The present invention relates to a method for constructing focused radar images, notably images obtained by synthetic aperture, this technique often being designated by the acronym SAR for "Synthetic Aperture Radar". The invention is applied notably to the production of high-resolution SAR images with the help of an aircraft equipped with a radar antenna.

BACKGROUND OF THE INVENTION

As a reminder, FIG. 1 illustrates a phase of acquiring data by a mobile carrier in "Spot" SAR mode, that is to say a mode in which the antenna beam is slaved permanently to the zone to be imaged. A radar fixed to an aircraft 101 illuminates an imaged zone 102 for a duration of illumination $T_e$ by slaving the antenna beam 103 onto the center 104 of said zone 102 along the whole of the trajectory 105 of the aircraft 101. This duration $T_e$ is inversely proportional to the resolution aimed at on the transverse axis 106, the resolution on the radial axis 108 being for its part, inversely proportional to the band emitted by the radar antenna. The imaged zone 102 is meshed by a net 110 of cells for each of which it is sought to associate at least one reflectivity level.

The detections of the radar make it possible to create an image on the radial axis 108 and the transverse axis 106, which are designated subsequently by the terms "Distance" axis 108 and "Doppler" axis 106 respectively. This image, referred to hereinafter as the "Distance-Doppler" image, delivers for each cell M situated inside the imaged zone 102, a distance value $D_M$ and a Doppler frequency value $f_M$, these two values $D_M$ and $f_M$ being referenced with respect to a given instant $t_{ref}$ corresponding, for example, to the elapsing of half the total duration of the illumination.

By describing a given angular sector around the imaged zone 102, the radar periodically collects a series of N distance-wise profiles with a recurrence frequency $f_r$ equal to $N/T_e$. Each of the N distance-wise profiles offers a one-dimensional representation of the imaged zone 102 along the distance axis 108. Furthermore, the distance axis 108 is divided into several bins, each of said bins preferably having a size which is slightly smaller than the distance-wise resolution. For a given distance bin, a spectral analysis along the transverse axis 106 performed on the collected signal makes it possible to discriminate Doppler-wise the various echoes contained inside this bin. This spectral analysis makes it possible to discriminate the echoes with the desired resolution if certain conditions are satisfied. To satisfy these conditions, focusing algorithms apply corrections to the signal collected for each of the reflectors of the imaged zone 102, these corrections comprising:

on the one hand, a distance-wise migration correction, to compensate for the variation in distance between the reflector and the phase center of the antenna in the course of the illumination;

on the other hand, a Doppler-wise migration correction, to compensate for the non-linear phase term of the signal due to the variations in the radar-reflector closing speed, so as to preserve a fixed-frequency signal.

The use of conventional focusing algorithms makes it necessary to know very accurately the trajectory of the phase center of the radar antenna in the course of the acquisition of the signals, a fortiori when the desired image resolution is fine, the required illumination time for the imaged zone then being long, this illumination time possibly, for example, exceeding a minute. Now, when the radar antenna is fixed to a mobile carrier such as an airplane, which is particularly sensitive to atmospheric disturbances, this trajectory cannot generally be known with sufficient accuracy, especially when the radar does not possess any inherent inertial system. Hence, so-called autofocus algorithms correct the residual focusing defects by utilizing the information contained in the radar signal itself, without using solely the outside information regarding trajectory measurement.

To summarize, conventionally, the generation of a focused SAR image proceeds in three steps. In a first stage, a full-resolution image is generated by a known image formation algorithm: there is then still a residual defocusing on account of the inaccuracies in measurement of the trajectory of the phase center of the antenna, stated otherwise, on account of the inaccuracies in measurement of the trajectory of the carrier. In a second stage, this residual defocusing is estimated by an autofocus technique applied to the previously computed "full-resolution" image. In a third stage, the image generated in the first step is re-focused using the previously estimated residual defocusing. This approach includes several drawbacks.

On the one hand, it totally dissociates the first step from the following steps. Now, the first step relates to the formation of a full-resolution image, the focusing quality of which depends on the quality of measurement of the trajectory of the phase center of the antenna, which measurement is generally performed by a sensor external to the radar, while the following steps endeavor to perform autofocusing processing operations utilizing the previously formed full-resolution image. Thus, when the illumination times become very long, errors measuring the trajectory of the carrier cause a deterioration in the focusing quality such that, on completion of the first step, the residual defocusing becomes impossible to estimate correctly in the course of the second step.

On the other hand, this approach makes it necessary to wait for the end of the acquisition of the radar signals before beginning to form the image since the first step is aimed at the formation from the outset of an image of finest possible resolution by utilizing the whole of the acquisition. Now, it is sometimes useful for roughly resolved images of a given zone to be available before the illumination time for said zone has elapsed entirely. Likewise, in a concern to optimize the use of the tools for processing radar signals, it may be advantageous to perform real-time computations, without waiting for the end of the complete illumination of the zone. The SAR image construction methods currently employed do not make it possible to satisfy these requirements in a simple manner.

Finally, the SAR images are polluted inherently by multiplicative noise which may be detrimental to the readability of the image. An effective scheme for solving this problem is to construct several images by rotating about the imaged zone so as to sum these images in terms of power after having superimposed them suitably, so that the standard deviation of the noise is reduced. However, the known methods of SAR imaging do not generally incorporate this scheme naturally during the generation of the image.

SUMMARY OF THE INVENTION

An aim of the invention is to propose a solution to the aforementioned problems by incorporating the autofocusing steps within the core of the method for the generation of a radar image, which generation can furthermore be performed as and when the data are collected by the radar. For this purpose, the subject of the invention is a method for constructing focused radar images, characterized in that it comprises at least the following steps:

chopping the radar illumination period into p sub-periods, two successive sub-periods overlapping temporally;

choosing $n_0$ successive sub-periods from among the p sub-periods, and for each of these $n_0$ sub-periods, performing radar acquisitions to generate an image $IM\_0_x$ of resolution $R_0$;

applying an autofocus processing to each of the $n_0$ images $IM\_0_x$ generated;

combining the $n_0$ images processed by autofocus so as to generate at least one new focused radar image $IM\_1_x$, the new radar image corresponding to the acquisitions for a duration of illumination equal to the concatenation of the n chosen sub-periods.

The radar can, for example, be fixed to a mobile carrier such as an aircraft or a satellite.

According to one mode of implementation of the method according to the invention, the method makes it possible to construct at least one high-resolution radar image, $n_0$ focused images being generated on completion of an autofocus processing, the steps of combining the images and of autofocus being thereafter repeated iteratively to obtain an image of desired resolution $R_{fin}$, the method comprising at least the following steps:

initializing variables $n_i$ and $R_i$ as follows: $n_i=n_0$ and $R_i=R_1$;

as long as the resolution $R_i$ is coarser than the desired resolution $R_{fin}$:

distributing the $n_i$ images of resolution $R_i$ generated previously, into $n_{i+1}$ sets, each of said sets containing at least two images, the images following one another temporally;

for each of the $n_{i+1}$ sets of images of resolution $R_i$:

combining the images of the set to generate a new image of finer resolution $R_{i+1}$;

applying an autofocus processing to the new image of finer resolution $R_{i+1}$;

updating the variables $n_i$ and $R_i$, $n_{i+1}$ becomes $n_i$ and $R_{i+1}$ becomes $R_i$.

The resolution of the image obtained depends on the duration of illumination covered by the set of the $n_0$ chosen sub-periods; the longer this duration is, the finer is the resolution of the resulting image. This method makes it possible to obtain a high-resolution image while decreasing the focusing errors customarily present when the radar illumination time is long. Furthermore, it is possible to have an under-resolved image $R_i$ before achieving the desired resolution $R_{fin}$.

According to one mode of implementation of the method according to the invention, the step of combining the images comprises at least the following sub-steps:

temporally inter-registering the images;

modifying the registered images so as to render them superimposable;

abutting the temporal signals corresponding to each of the superimposable images so as to generate a new signal, applying a Fourier transform on the time axis to said new signal so as to generate at least one image of resolution $R_1$ finer than $R_0$.

For the illumination durations considered and the error classes considered with regard to the measurement of the trajectory of the phase center of the antenna, the error made in the temporal registration is manifested from one image to another by a uniform residual shift over the set of points of the imaged zone.

According to one mode of implementation of the method according to the invention, a reference image $IM_{ref}$ is chosen from among the $n_0$ images to be combined, and the step of temporal inter-registering of the images comprises at least the following sub-steps:

for each of the $n_0-1$ images $IM_x$ other than the image $IM_{ref}$;

registering in terms of position the reflecting points of the image $IM_x$ with respect to the reflecting points of the reference image $IM_{ref}$;

registering in terms of phase the image $IM_x$ with respect to $IM_{ref}$.

The temporal registration step makes it possible to reference all the images with respect to a common time reference. This step utilizes the measurement of trajectory of the phase center of the antenna over time. The inaccuracy in this measurement is manifested as a residual shift common to the set of points of the imaged zone. This uniform residual shift is thereafter corrected to render the images superimposable. Preferably, the reference image IMref chosen is the image arising from a central sub-period among the n0 sub-periods.

According to one mode of implementation of the method according to the invention, a reference image $IM_{ref}$ is chosen from among the $n_0$ images to be combined, the step of modifying the registered images so as to render them superimposable comprising at least the following sub-steps:

for each of the $n_0-1$ images $IM_x$ other than the image $IM_{ref}$;

estimating the residual shift of $IM_x$ with respect to $IM_{ref}$ which provides an estimate of the position of the inter-correlation spike for these two images $IM_{ref}$ and $IM_x$;

correcting the image $IM_x$ by applying thereto the opposite shift to that estimated in the previous step.

According to one mode of implementation of the method according to the invention, one and the same geographical zone is illuminated by the radar throughout the duration of the illumination and the $n_0$ sub-periods of temporal chopping overlap substantially by half, the sets being chosen so as to comprise three images of resolution $R_i$, the resolution $R_{i+1}$ of the image generated on the basis of said three images being substantially twice as fine as the resolution $R_i$.

According to one mode of implementation of the method according to the invention, the combining processing operations are parallelized, images of resolution $R_a$ which are grouped together in a first set, being combined in parallel with the combining of images of resolution $R_b$, $R_b$ being finer than $R_a$, which are grouped together in a second set, the images of the first set arising from radar acquisitions performed over a period disjoint from the radar acquisitions performed to produce the images of the second set. The parallelization of the processing operations makes it possible to obtain an image at the earliest, and to optimize the use of the resources.

According to one mode of implementation of the method according to the invention, the method makes it possible to construct a radar image with low radiometric noise and/or with widened coverage, the step of combining the images arising from each of the illumination sub-periods comprising at least the following steps:

temporally inter-registering the images (1103);

modifying the registered images so as to render them superimposable (404);

tailoring the superimposable images in a common frame of reference (1105);

summing the tailored images obtained so as to average them in terms of power (1106).

According to one mode of implementation of the method according to the invention, the method makes it possible to construct at least one radar image of high resolution and with low radiometric noise, the step of combining the images arising from each of the illumination sub-periods comprising at least the following steps:

choosing between a first type of combination suitable for forming images of high resolution and a second type of combination suitable for forming images with low radiometric noise;

if the second type of combination is chosen, then:
  temporally inter-registering the images;
  modifying the registered images so as to render them superimposable;
  tailoring the superimposable images in a common frame of reference;
  summing the tailored images obtained so as to average them in terms of power in order to produce the image as output of the method;

otherwise, testing whether the resolution of the images to be combined is coarser than the desired resolution;

if the resolution of the images to be combined is as fine or finer than the desired resolution, then producing the image as output of the method;

if the resolution of the images to be combined is coarser than the desired resolution, then:
  distributing the images to be combined, into n sets, each of said sets containing at least two images, the images following one another temporally;
  for each of the n sets of images:
    combining the images of the set to generate a new image of finer resolution;
    returning to the autofocus step and applying an autofocus processing to the new image of finer resolution;
    repeating a step of combining the images.

BRIEF DESCRIPTION OF THE DRAWINGS

Other characteristics will become apparent on reading the detailed description given by way of nonlimiting example which follows, in relation to appended drawings which represent:

FIG. 9, an illustration of a step of abutting of the images of FIG. 8 in an SAR image construction method according to the invention;

FIG. 10, the resulting image, on completion of a coherent combining of the three images of FIG. 5 in an SAR image construction method according to the invention;

For the sake of clarity, the same references in different figures designate the same elements.

DETAILED DESCRIPTION

Figure 1:
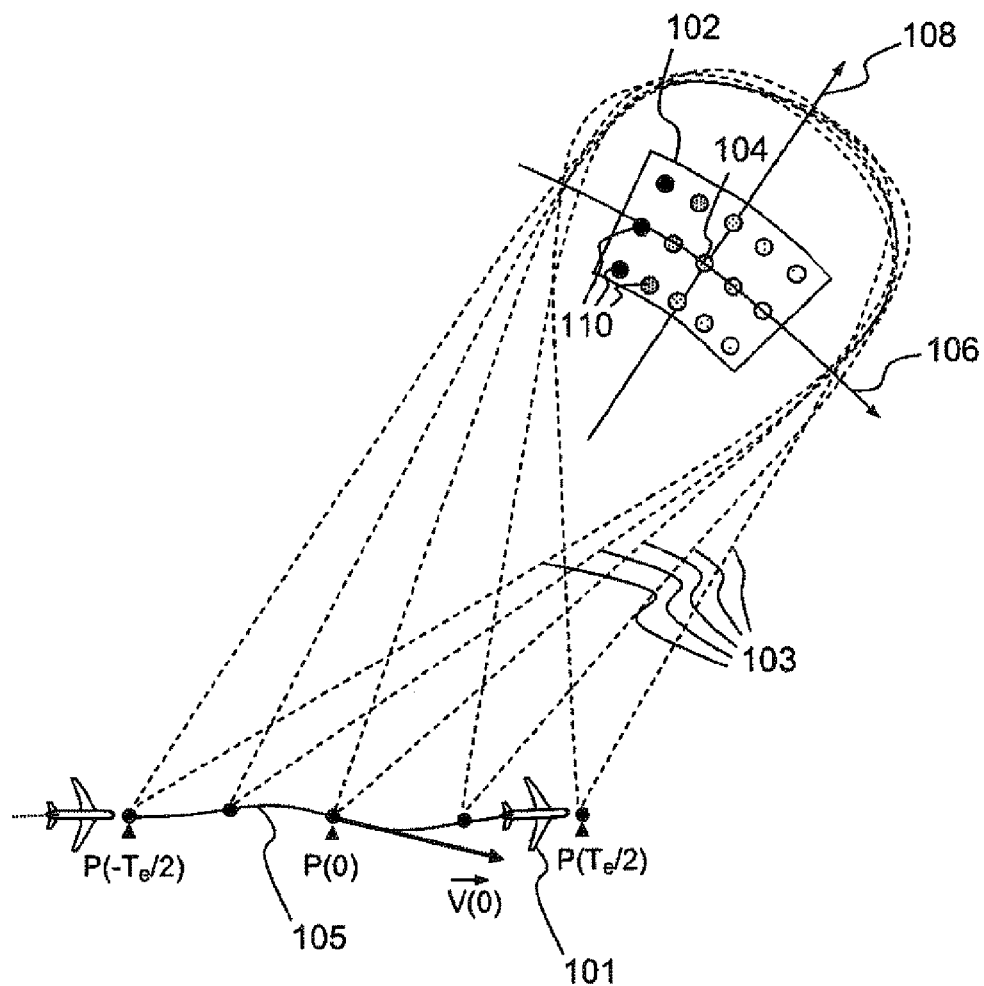
FIG. 1, an illustration of a phase of acquiring data by a mobile carrier (prior art)
Figure 2:
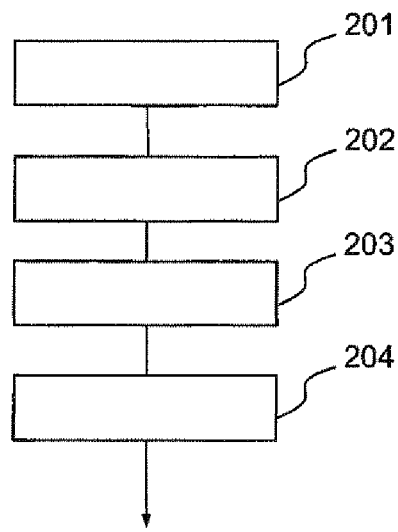
FIG. 2, a schematic exhibiting the main steps of an SAR image construction method according to the invention, FIG. 2a, a schematic exhibiting the steps of a first SAR image construction method according to the invention, FIG. 2b, a schematic exhibiting the steps of a second SAR image construction method according to the invention, FIG. 2c, a schematic exhibiting the steps of a third SAR image construction method according to the invention, FIG. 3, a diagram illustrating the SAR image construction method of FIG. 2c.

FIG. 2 is a schematic presenting the main steps of an SAR image construction method according to the invention.

In a first stage 201, the complete illumination period $T_e$ is chopped up into p sub-periods denoted $P_x$, x varying from 1 to p, two successive sub-periods $P_x$ and $P_{x+1}$ partially overlapping in time.

In a second stage 202, for each sub-period $P_x$, a Distance-Doppler image $IM\_0_x$ is generated, the image $IM\_0_x$ comprising the following characteristics:

$IM\_0_x$ is referenced temporally with respect to the center $t_x$ of the sub-period $P_x$;

the central point of this image corresponds to the point of the zone aimed at by the antenna beam at the instant $t_x$ (in the case of a Spot radar mode, this point is identical throughout the illumination $T_e$);

the transverse resolution $R_0$ of the image $IM\_0_x$ corresponds to a duration of illumination $T_e/k$ that is less than the duration $T_e$ of the complete illumination, its resolution $R_0$ is therefore generally coarser than the final resolution $R_{fin}$ aimed at;

the radial resolution of the image $IM\_0_x$ does not depend on the quality of measurement of the trajectory of the phase center of the antenna in the course of the illumination; consequently, this radial resolution may from the outset be as fine as possible.

In a third stage 203, for each image $IM\_0_x$, conventional autofocus algorithms are applied to correct the focusing defects of the image $IM\_0_x$. So that the autofocus algorithms employed make it possible to obtain a good focusing quality for the image $IM\_0_x$, the duration $T_e/k$ of an illumination sub-period $P_x$ is chosen sufficiently short: a few seconds at the maximum, while the total illumination may cover several tens of seconds, so that the inaccuracies in measurement of the trajectory of the phase center of the antenna are tiny and that the focusing errors are totally reversible, or almost so.

In a fourth stage 204, the images $IM\_0_x$ are combined, either to obtain one or more images of finer resolution than $R_0$, or to obtain an image whose spatial coverage is magnified or whose radiometric noise is reduced, or else to obtain one or more images comprising several of these improvements. Two schemes for combining the images are detailed subsequently.

Figure 2A:
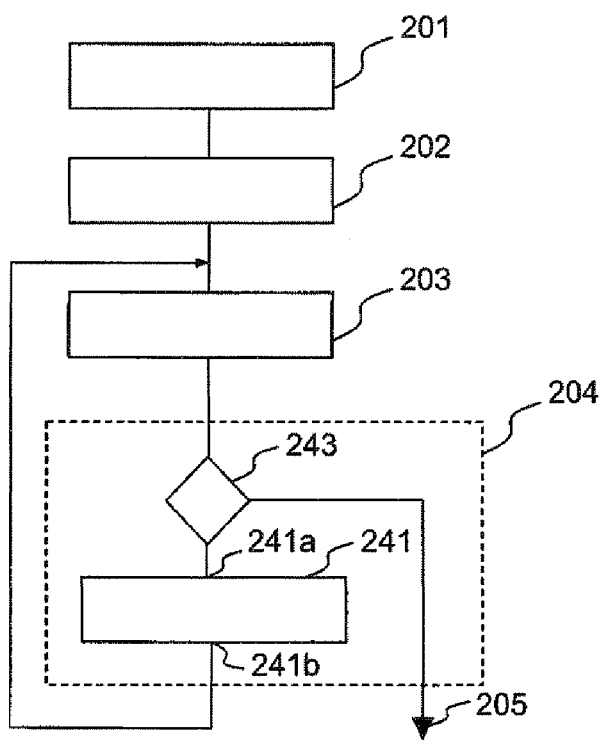

FIG. 2a is a schematic presenting the steps of a first SAR image construction method according to the invention, in which a first scheme for combining the images is employed. The first steps 201, 202, 203, respectively, of chopping the illumination period 201, of generating 202 the images IM_0$_x$, and then of autofocus 203, are identical to those described in FIG. 2.

On completion of the autofocus step 203, a test 243 is executed to determine whether the fineness of transverse resolution R$_0$ of the images IM_0$_x$ is greater than or equal to the desired fineness of resolution R$_{fin}$. If the fineness of image resolution is insufficient in relation to the expected resolution R$_{fin}$, a combining step 241 is executed to refine the resolution. In the course of this step 241, several images IM_0$_x$ arising from temporally overlapping illumination sub-periods are combined with the aim of producing one or more new images IM_1$_x$ whose resolution R$_1$ is refined along the transverse axis. This combining scheme is referred to hereinafter as "coherent combining".

On completion of this coherent combining step 241, the method returns to step 203 of correcting the focusing defects of the images by providing the refined images IM_1$_x$ to the autofocus algorithm.

After N iterations of the coherent combining step 241, when the test 243 indicates that the resolution R$_N$ of the images obtained IM_N$_x$ during the last iteration of combinations is sufficient in relation to the resolution R$_{fin}$ aimed at (or that a single image IM_N$_1$ has been produced during the latter iteration, thereby, naturally, rendering any additional combination impossible), then the image or images IM_N$_x$ are transmitted as output 205.

Figure 2B:
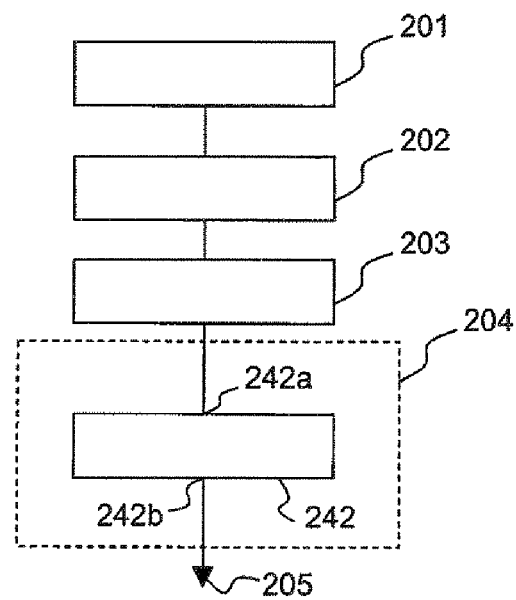

FIG. 2b is a schematic presenting the steps of a second SAR image construction method according to the invention, in which a second scheme for combining the images is employed. The first steps 201, 202, 203, respectively, of chopping the illumination period 201, of generating 202 the images IM_0$_x$, and then of autofocus 203, are identical to those described in FIG. 2.

The second scheme for combining the images IM_0$_x$ is a so-called "non-coherent" combining. This scheme does not make it possible to refine the resolution; it is aimed at improving the radiometry of the image and/or magnifying the size of the imaged zone. According to this scheme, n illumination sub-periods P$_x$, n≤p, are used to form the whole of the imaged zone.

On completion of the autofocus step 203, a step 242 of non-coherent combining of the images is executed so as to produce one or more images with low radiometric noise and/or with widened coverage; the image or images produced are transmitted as output 205.

Figure 2C:
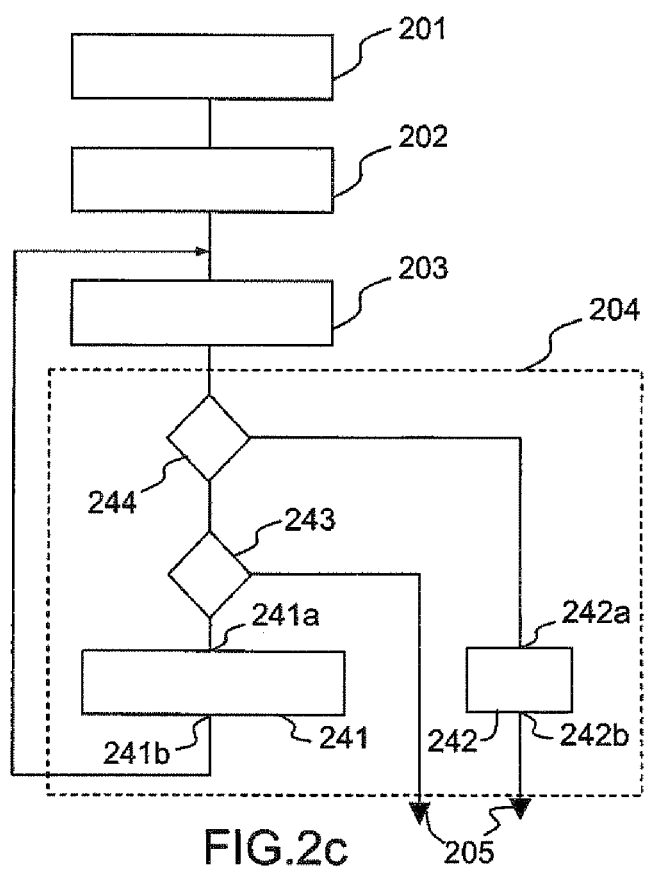

FIG. 2c is a schematic presenting the steps of a third SAR image construction method according to the invention, in which the first and the second scheme for combining the images are employed. The first steps 201, 202, 203, respectively, of chopping the illumination period 201, of generating 202 the images IM_0$_x$, and then of autofocus 203, are identical to those described in FIG. 2.

On completion of the autofocus step 203, a first test 244 is performed to decide whether a non-coherent combining must be performed on the images IM_0$_x$. If such a combining is decided, then a step 242 of non-coherent combining is executed and the image or images produced are transmitted as output 205. Otherwise, a test 243 is executed to determine whether the resolution R$_0$ of the images IM_0$_x$ is sufficient in relation to the desired resolution R$_{fin}$. If the resolution R$_0$ turns out to be fine enough, the images IM_0$_x$ are transmitted as output 205. Otherwise, in a manner analogous to the method of FIG. 2a, steps 241 of coherent combining are then executed iteratively N times, until the resolution R$_N$ is sufficient or until a single image has been produced on completion of the last combining. However, in contradistinction to the method of FIG. 2b, after each iteration, the first test 244 is performed to determine whether a non-coherent combining of the images must be performed.

Thus, by virtue of the method of FIG. 2c, it is possible to produce images satisfying a compromise between, on the one hand, their fineness of resolution and on the other hand, their radiometric noise and/or their spatial coverage.

Figure 3:
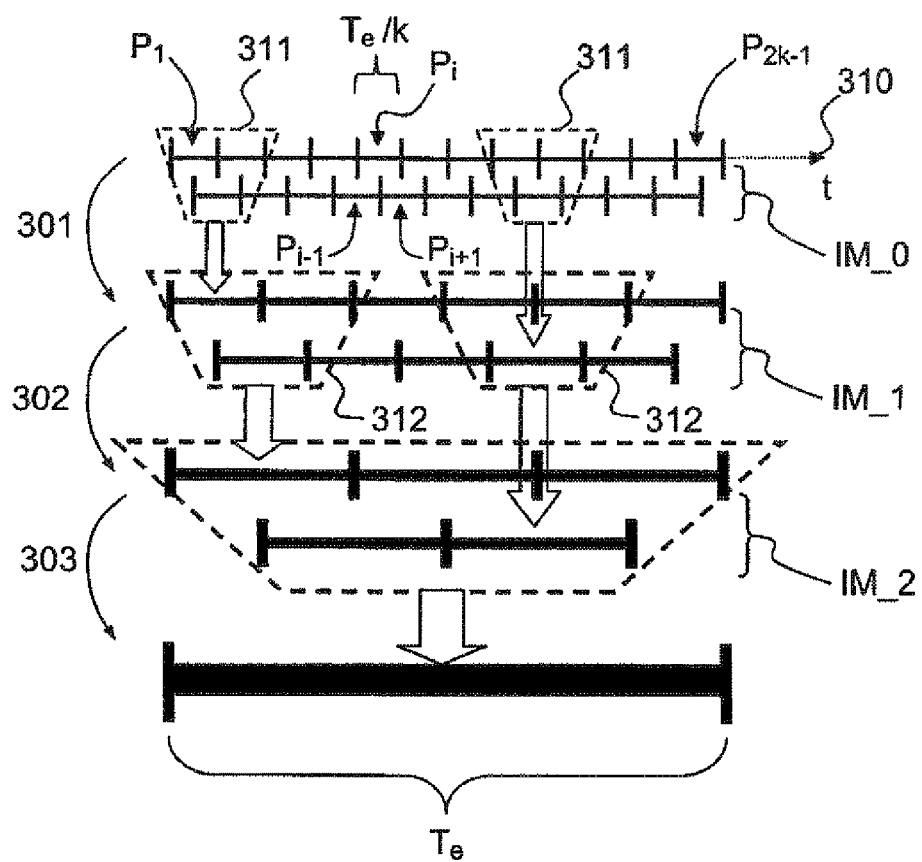

FIG. 3, a diagram illustrating the SAR image construction method of FIG. 2c.

In the course of the first step 201 of the method (FIG. 2c), the time axis 310 is segmented so that the complete illumination period T$_e$ is chopped up into 2 k−1 sub-periods P$_x$, x varying from 1 to 2 k−1. In the example, two successive sub-periods P$_x$ and P$_{x+1}$ overlap by half and all the sub-periods P$_x$ have the same duration T$_e$/k. According to another implementation of the method according to the invention, the illumination sub-periods P$_x$ do not all have the same duration and/or the durations of overlap between two successive sub-periods P$_x$ and P$_{x+1}$ vary.

Thereafter, for each sub-period P$_x$, an image IM_0$_x$ of transverse resolution R$_0$ is formed (second step 202, FIG. 2c), the image IM_0$_x$ thereafter being corrected of the focusing defects (third step 203, FIG. 2c). Next, on completion of the previous three steps 201, 202, 203, one or more combinings of images 204 are performed. In the example of FIG. 3, two steps of coherent combining 301, 302 (reference 241 in FIG. 2c) followed by a non-coherent combining step 303 (reference 242 in FIG. 2c) are executed.

In the course of the first coherent combining step 301 of the example, sets 311 of three images are chosen and the images of said sets 311 are combined, each of the 2 k−1 images IM_0$_x$, arising from an illumination sub-period P$_x$, being combined at least once. Thus, in the example, the images of the following sets 311 are combined: {IM_0$_1$, IM_0$_2$, IM_0$_3$}, {IM_0$_3$, IM_0$_4$, IM_0$_5$} ... {IM_0$_{i-1}$, IM_0$_i$, IM_0$_{i+1}$}, {IM_0$_{i+1}$, IM_0$_{i+2}$, IM_0$_{i+3}$} ... {IM_0$_{2k-3}$, IM_0$_{2k-2}$, IM_0$_{2k-1}$}. In the example, as the sub-periods P$_x$ overlap by half, when all the images IM_0$_i$ have been combined, k−1 new Distance-Doppler images IM_1$_x$ are generated, each being associated with a duration of illumination 2.T$_e$/k that is doubled with respect to the duration of illumination of the initial images IM_0$_x$. These new images IM_1$_x$ therefore have a transverse resolution R$_1$ that is substantially twice as fine as R$_0$.

Thereafter, in the example of FIG. 3, a second step 302 of coherent combining is repeated by combining the images IM_1$_x$ of transverse resolution R$_1$ that is twice as fine as R$_0$. The images IM_1$_x$ are grouped together in (k−1)/2 sets 312 and then, the images belonging to each of these sets 312 are combined. The (k−1)/2 images obtained IM_2$_x$ then have a resolution R$_2$ that is substantially quadrupled with respect to that of the initial images IM_0$_x$.

Finally, step 303 of non-coherent combining combines all the images IM_2$_x$ to form an image IM$_{final}$ associated with the complete illumination period T$_e$. The latter image IM$_{final}$ has a resolution equal to R$_2$ and benefits from a reduction in its radiometric noise and/or from widened coverage.

Moreover, to obtain radar images that can be utilized at the earliest and/or with a concern to optimize the use of the processing resources used to execute the coherent combining steps 301, 302, certain processing operations may be performed in parallel. Hence, the steps of the method that is presented in FIG. 2 are not necessarily executed in a purely sequential manner. Indeed, returning to the example of FIG. 3, once at least three images IM_$0_1$, IM_$0_2$, IM_$0_3$ have been formed on completion of the second step 202 of the method of FIG. 2, and corrected during the third autofocus step 203, these images IM_$0_1$, IM_$0_2$, IM_$0_3$ may be combined during the fourth combining step 204. Simultaneously with the combining of these three images, other images IM_$0_x$, x>3, are acquired (second step 202) and corrected (third step 203). Thus, images of intermediate resolution may be produced without waiting for the complete illumination time $T_e$ to have elapsed.

Figure 4:
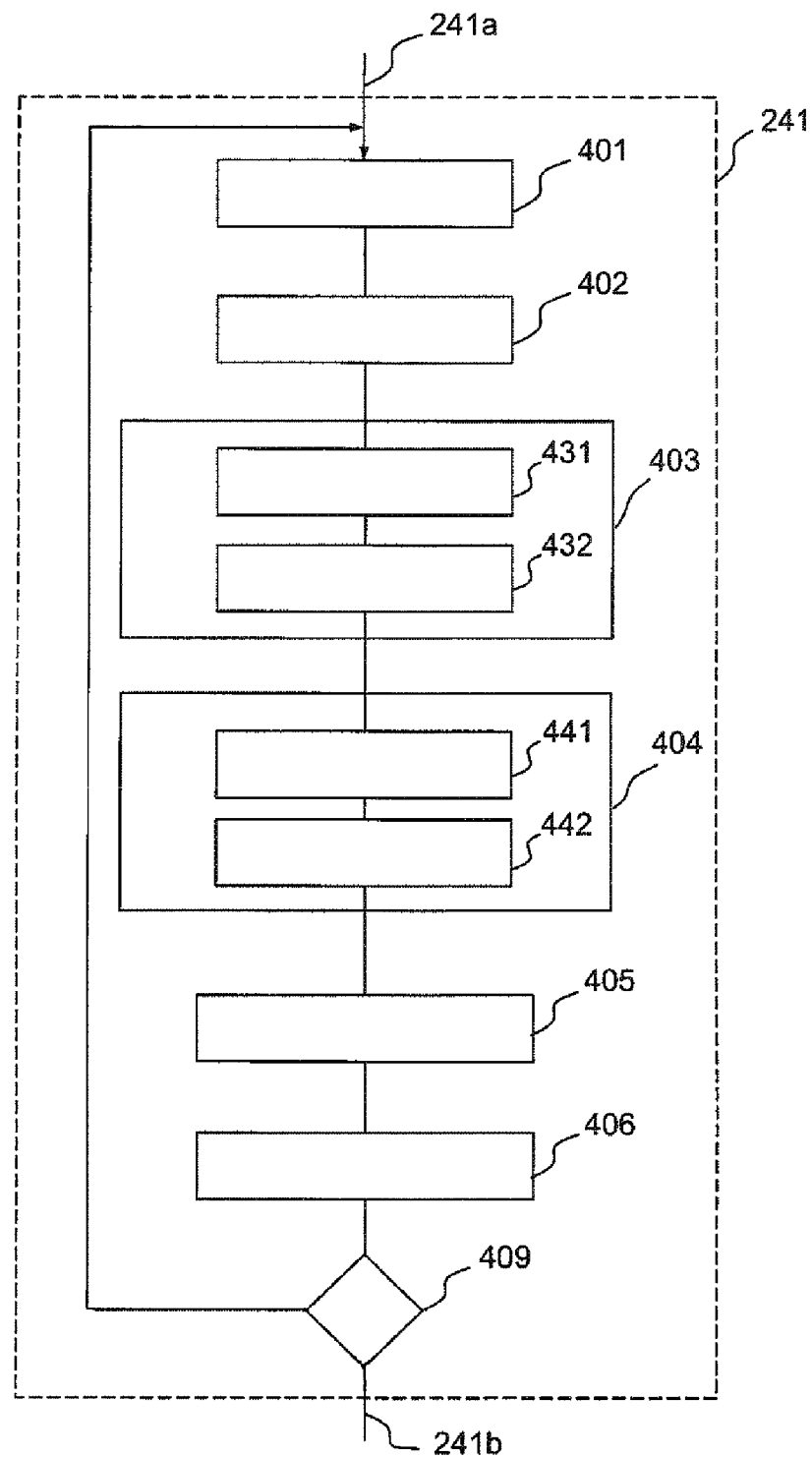
FIG. 4, a schematic specifying the steps to be executed for the coherent combining of the images in an SAR image construction method according to the invention.

FIG. 4 presents a schematic specifying the steps to be executed for the coherent combining 241 of the images in an SAR image construction method according to the invention.

During a first step 401, several successive images are chosen from among the 2 k−1 images IM_$0_x$ provided as input 241a. For example, three images IM_$0_{i-1}$, IM_$0_i$, and IM_$0_{i+1}$ arising respectively from three successive sub-periods $P_{i-1}$, $P_i$, and $P_{i+1}$ are chosen, $1\_<\_i\_<\_2\_k-1$. The sub-periods $P_{i-1}$ and $P_{i+1}$ corresponding respectively to the first IM_$0_{i-1}$ and to the third image IM_$0_{i+1}$, are disjoint, and the sub-period $P_i$, corresponding to the central image IM_$0_i$, overlaps temporally half of each of the other two sub-periods $P_{i-1}$ and $P_{i+1}$.

During a second step 402, a reference image IM$_{ref}$ is chosen from among the images selected during the first step 401. In the example, the reference image chosen is the central image IM_$0_i$.

During a third step 403, the images other than the reference image IM$_{ref}$—in the example, the images IM_$0_{0-1}$, and IM_$0_{i+1}$,—are registered temporally with respect to the reference image IM$_{ref}$—in the example, with respect to IM_$0_i$—. Indeed, each of the images IM_$0_x$ being initially referenced with respect to a fixed instant $t_x$ of its illumination sub-period $P_x$, the temporal references of these images must be modified, so that said images are all referenced with respect to a common instant. This temporal registration is done in two stages 431, 432. In a first stage 431, the images are registered in terms of position and then subsequently 432, the images are registered in terms of phase. This third step 403 is detailed further on, with regard to FIGS. 5, 6, 7a, 7b, and 7c.

In the example, the two images IM_$0_{i-1}$, and IM_$0_{i+1}$ are registered with respect to the reference instant t, of the central image IM_$0_i$, the latter image not being, in the guise of reference image, registered. According to another embodiment, no reference image IM$_{ref}$ is chosen and all the images chosen during the first step 401 are registered with respect to an instant different from the temporal reference of one of the images to be combined. Advantageously, the common reference instant $t_{ref}$ is chosen to be relatively central in relation to the set of sub-periods $P_x$ to be combined, so as to decrease the maximum discrepancy between $t_{ref}$ and $t_x$.

During a fourth step 404, the images other than the reference image IM$_{ref}$ are modified so as to be able to be superimposable on the reference image IM$_{ref}$. Indeed, on completion of the third step 403, the images IM_$0_x$ are not directly superimposable since there is still a residual shift along the Doppler axis 106 and, to a lesser extent, along the Distance axis 108 between the position of the reflectors which is provided by the reference image IM$_{ref}$ and the position of the reflectors which is read on a different image from the reference image. The superimposing of the images is then performed in two stages 441, 442. In a first stage 441, a residual shift in position is estimated; in a second stage 442, this residual shift is corrected and a deweighting function is applied. This fourth step 404 is detailed further on, with regard to FIG. 8.

During a fifth step 405, the last residual discontinuities in phase which still remain from one illumination sub-period $P_x$ to the next $P_{x+1}$ are firstly canceled, and then the signals corresponding to the focused and superimposable images, arising from the fourth step 404, are abutted in the time domain to form a new signal defined over an illumination sub-period equal to the duration of the concatenation of the sub-periods of the images to be combined. This fifth step 405 is detailed further on, with regard to FIG. 9.

During a sixth step 406, a Fourier transform along the time axis is applied to the new signal obtained during the fifth step 405, so as to produce the image resulting from the coherent combining of the initial images IM_$0_x$, this resulting image being associated with a widened duration of under-illumination.

Thus, in the example, on completion of these six steps 401, 402, 403, 404, 405, 406, the combining of the three images IM_$0_{i-1}$, IM_$0_i$, and IM_$0_{i+1}$ generates a new Distance-Doppler image IM_$1_i$ of resolution $R_1$ which is substantially twice as fine as the resolution $R_0$ of the initial images IM_$0_x$, the image IM_$1_i$ being referenced temporally with respect to the central instant of the illumination sub-period formed by concatenating the initial illumination sub-periods $P_{i-1}$, $P_i$ and $P_{i+1}$.

Although the exemplary implementation illustrated presently is related to a radar acquisition mode of spot type, the method can be applied within the framework of other types of acquisition. Hence, when the method according to the invention is implemented on a radar operating in strip mode—this mode often being designated by the term "StripSAR"—, the gain in resolution due to the execution of an iteration of the method is less than or equal to two, while the spatial coverage obtained is larger than in spot mode. Indeed, in strip mode, over the duration of an illumination sub-period $P_{i+1}$ following a first illumination sub-period $P_i$, the imprint of the antenna beam has moved, decreasing the area of the zone common to the two sub-periods $P_i$ and $P_{i+1}$, but increasing the area of the zone covered during at least one of the sub-periods $P_i$ and $P_{i+1}$. This remark is a fortiori applicable to the implementation of the method on a radar operating in scanning mode—otherwise known as "ScanSAR".

After the combining of the images IM_$0_{i-1}$, IM_$0_i$, and IM_$0_{i+1}$, a test 409 is executed to determine whether at least one image from among the 2 k−1 images IM_$0_x$ has not yet been combined with other images. If there remains at least one image IM_$0_x$ to be combined, then the method returns to the first step 401 of choosing the images so as to inter-combine other images IM_$0_x$. Thus, combinations are performed on different sets of images until all the images IM_$0_x$ arising from the illumination sub-periods $P_x$ have been combined at least once. According to another implementation of the method, only a portion of the complete illumination time $T_e$ is used; hence, the abovementioned test 409 does not pertain to the use of all the 2 k−1 images IM_$0_x$, but it verifies that all the images IM_$0_x$ corresponding to said temporal portion have been combined at least once.

When the test 409 indicates that all the images IM_$0_x$ have been used for at least one combination, the images IM_$1_x$ generated by the combinations are transmitted as output 241b.

For a better understanding of step 241 of coherent combining of images, the steps presented in FIG. 4 are detailed with regard to FIGS. 5, 6, 7a, 7b, 7c, 8, 9, and 10.

Figure 5:
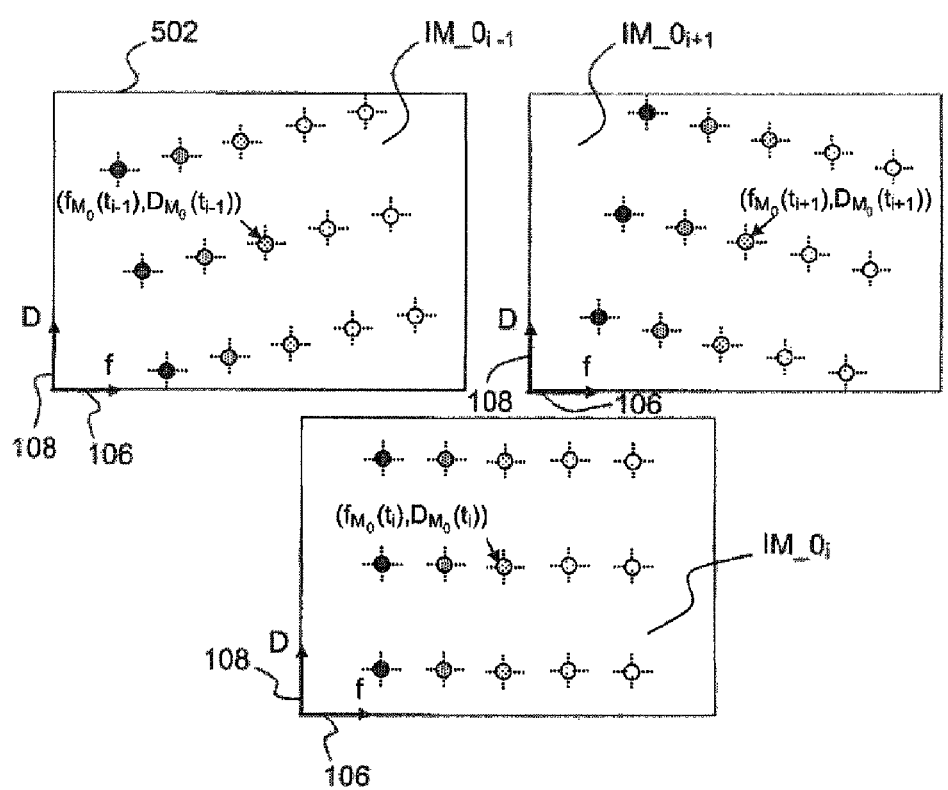
FIG. 5, an example of three images to be combined by an SAR image construction method according to the invention.

FIG. 5 presents an example of three images IM_$0_{i-1}$, IM_$0_i$, and IM_$0_{i+1}$ to be combined, these images being, during the coherent combining 241 (FIG. 4), provided as output from the step 401 of choosing the images from among the 2k−1 initial images. Each image IM_0$_x$, i−1≤ x ≤ i+1, exhibits the following characteristics:

the image IM_0$_x$ is focused, stated otherwise, the impulse responses are canonical on both axes (by virtue of the autofocus step 203, FIG. 2);

the image IM_0$_x$ is, in the example, referenced temporally with respect to the center of the corresponding illumination sub-period P$_x$;

the image IM_0$_x$ is centered on the point of the zone aimed at by the antenna beam at the central instant of the sub-period P$_x$.

The third step 403 (FIG. 4) of the method of coherent combining of images comprises, in a first stage 431, a registration in terms of position. Considering the reference instant t$_i$ of the central image IM_0$_i$ as the new reference instant of the three images to be combined, the images IM_0$_{i−1}$, IM_0$_{i+1}$ are, in the example, the only ones to which the registration operation is pertinent, the image IM_0$_i$ being considered to be a reference image IM$_{ref}$.

Consider an image to be registered IM_0$_x$, x≠i. The imaged zone 502 on the image IM_0$_x$ occupies at the instant t$_i$ a Doppler span and a Distance span respectively denoted |f$_{min,x}$; f$_{max,x}$||D$_{min,x}$; D$_{max,x}$|. This Doppler-Distance span is firstly meshed with a grid identical to that of the image IM_0$_i$ that is to say by employing the same sampling along the Doppler axis and the same sampling along the Distance axis. In this new Doppler-Distance grid, each pair (f$_M$(t$_i$), D$_M$(t$_i$)) characterizes at the instant t$_i$ the Doppler and the Distance of a reflector M imaged in the course of the illumination sub-period P$_x$ associated with the image IM_0$_x$. The registration in terms of position of the image IM_0$_x$ is performed by filling this grid (referenced temporally with respect to t$_i$) by assigning to each of its pixels a value tapped off from the image IM_0$_x$, referenced with respect to an instant t$_x$. Thus, for each pair (f$_M$(t$_i$),D$_M$(t$_i$)) characterizing at the instant t$_i$ the Doppler and the Distance of a reflector M imaged in the course of the illumination sub-period P$_x$, the following steps are executed:

estimating at the instant t$_x$ the Doppler f̂$_M$(t$_x$) and the distance D̂$_M$(t$_x$) of the reflector M as a function of:

the knowledge of the Doppler and the distance of the reflector M at the instant t$_i$;

the measurement of the trajectory of the radar between the instants t$_i$ and t$_x$ tapping off from the image IM_0$_x$ the value read at this estimated position (f̂$_M$(t$_x$),D̂$_M$(t$_x$));

assigning this value to the pixel associated with the pair (f$_M$(t$_i$),D$_M$(t$_i$)) in the new grid.

Figure 6:
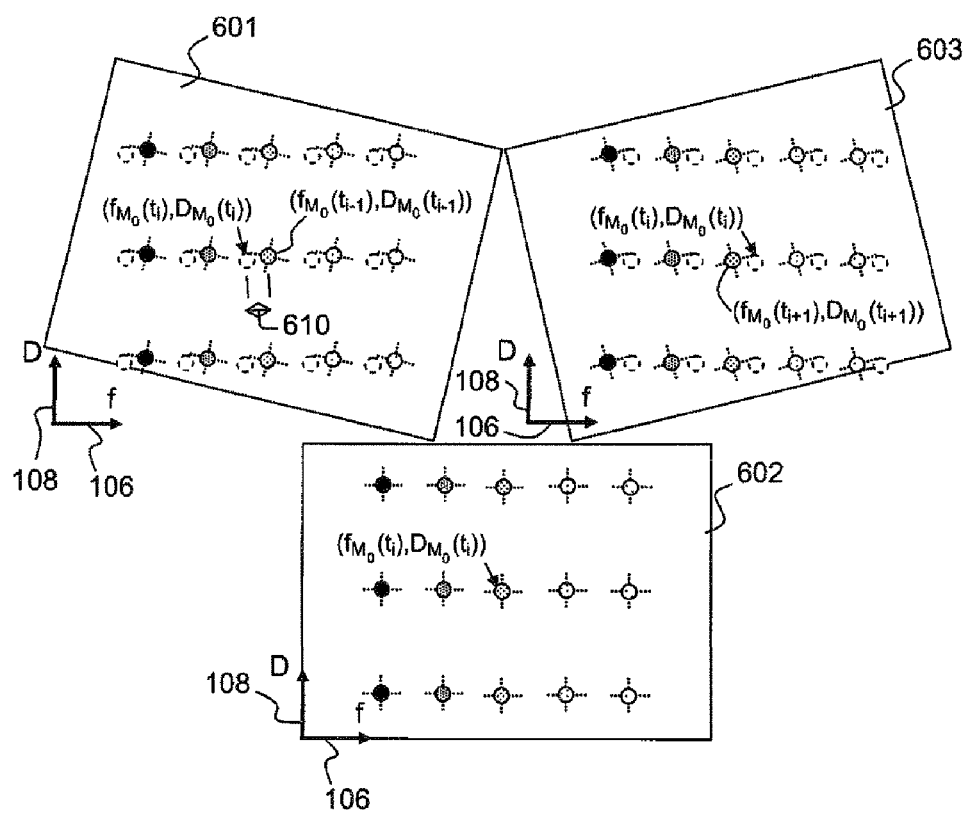
FIG. 6, the three images of FIG. 5 modified on completion of the execution of a step of registration in terms of position in an SAR image construction method according to the invention.

FIG. 6 shows the three images of FIG. 5, as modified on completion of the step of registration in terms of position 431.

In the ideal case of perfect knowledge of the radar-reflectors relative motion, the position-wise registration operation would provide as output three Distance-Doppler images on which the reflectors imaged in common during the three illumination sub-periods P$_{i−1}$, P$_i$, and P$_{i+1}$ would occupy identical positions. Now, for each reflector position, the registration operation estimates a distance-wise migration and a Doppler-wise migration between two instants t$_i$ and t$_x$ based on a measurement of the trajectory of the radar, which measurement is by nature imperfect.

Consequently, the three Distance-Doppler images 601, 602, 603 of FIG. 6 are not yet perfectly "superimposable" at this juncture: between an image IM_0$_x$, x≠i, and the image IM_0$_i$, there is still a residual shift 610 common to all the points, along the Doppler axis 106 and to a lesser extent along the Distance axis 108.

According to one embodiment, an approximate computation of Distance-wise migration and of Doppler-wise migration is performed for the pairs (f$_M$(t$_i$),D$_M$(t$_i$)) belonging to the grid associated with the illumination sub-period P$_x$. Indeed, these migrations vary quasi-linearly as a function of the position of the points Distance-wise and Doppler-wise. It is thus sufficient to compute in an exact manner these migrations for a restricted number of points spaced apart in the imaged zone and then merely to linearly interpolate these exact results, for the other points.

Moreover, in the new grid associated with an illumination sub-period P$_x$, the value assigned to the pixel associated with the pair (f$_M$(t$_i$),D$_M$(t$_i$)) is the value read at the position (f̂$_M$(t$_x$),D̂$_M$(t$_x$)) in the image IM_0$_x$. Now, the latter position is generally distributed over several pixels of the image IM_0$_x$. A two-dimensional interpolation is therefore necessary.

In order to ensure the focusing of each of the points imaged over an illumination sub-period that is substantially doubled with respect to the duration of the initial sub-periods P$_{i−1}$, P$_i$, P$_{i+1}$, the signal associated with a given reflector must be tailored up in phase from one illumination sub-period to another. The third step 403 comprises, in a second stage, a phase-wise registration which is aimed precisely at removing, for each reflector, the residual phase jumps which, at this juncture of the processing, remain from one illumination sub-period to another.

Figure 7A:
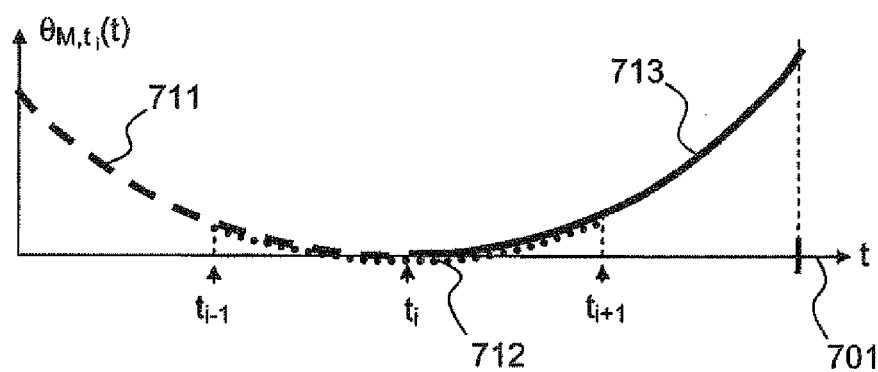
FIGS. 7a, 7b and 7c, an illustration of the step of registration in terms of phase performed during a coherent combining of the images in an SAR image construction method according to the invention.
Figure 7B:
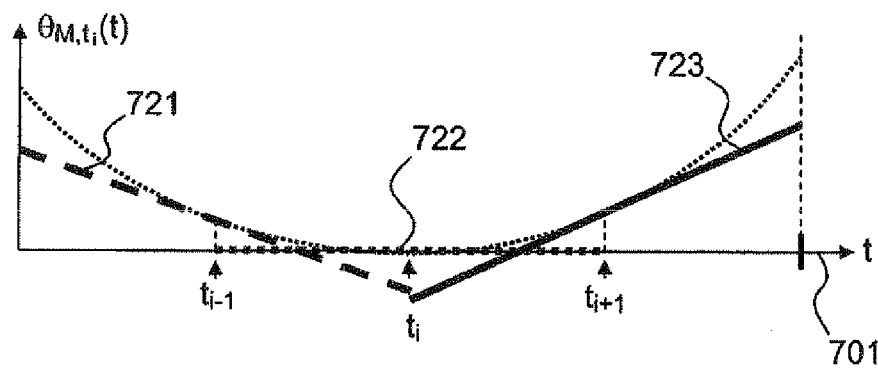
Figure 7C:
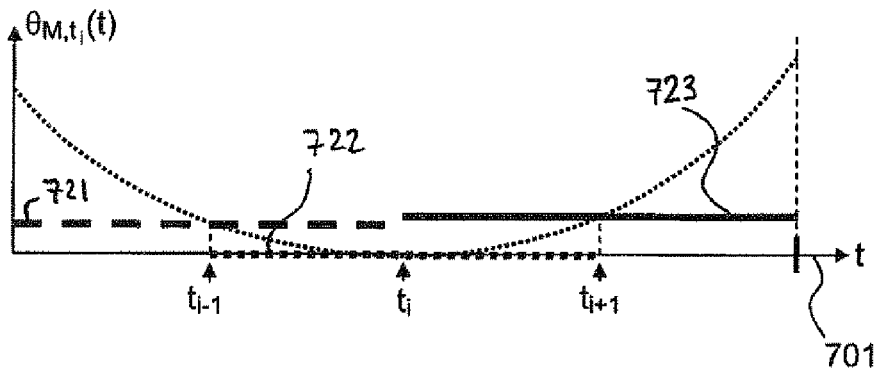

FIGS. 7a, 7b and 7c illustrate this step of registration in terms of phase 432 of the images 601, 602, 603 of FIG. 6. As a reminder, focusing with respect to the instant t, consists, for a given reflector M, in canceling the non-linear phase component φ$_{M,ti}$(t) in the signal backscattered by this reflector M. Thus only the linear component tapped off at the instant t, is preserved, the slope of this linear component being proportional to the Doppler at the instant t$_i$, denoted f$_M$(t$_i$). The phase of the signal over time is expressed as follows:

$$\frac{4\pi}{\lambda} D_M(t) = \frac{4\pi}{\lambda} D_M(t_i) - 2\pi \times f_M(t_i) \times (t - t_i) + \phi_{M,t_i}(t)$$

where
the term $$\frac{4\pi}{\lambda} D_M(t)$$

represents the phase of the signal over time;
the term $$\frac{4\pi}{\lambda} D_M(t_i)$$

represents the phase of the signal at the instant t$_i$;
the term 2π×f$_M$(t$_i$)×(t−t$_i$) allows positioning on the Doppler axis 106;
and φ$_{M,t_i}$(t) is the phase term of order greater than or equal to two; it is the latter term that one seeks to cancel so as to ensure focusing.

This phase term φ$_{M,ti}$(t) before correction is represented on a graph in FIG. 7a, φ$_{M,ti}$(t) as ordinate on the graph, the abscissa corresponding to the time 701. It must be canceled with a view to performing a coherent combining 241 of the images.

In a first stage, each image $IM\_0_x$, $i-1 \leq x \leq i+1$, is focused, stated otherwise, the phase term of order greater than or equal to two is compensated on each of the illumination sub-periods $P_{i-1}$, $P_i$, $P_{i+1}$. Nonetheless, the positioning of the reflector M on the Doppler axis remains different in the three images $IM_{i-1}$, $IM_i$, $IM_{i+1}$, as shown by FIG. 7b, which illustrates the evolution of the phase residual 711, 712, 713 of each illumination sub-period $P_{i-1}$, $P_i$, $P_{i+1}$ as a function of the time 701 after the aforementioned focusing. On completion of this focusing, the phase residual associated with an illumination sub-period $P_x$ is equal to:

$$\phi_{M,ti}(t_x) - 2\pi \times [f_M(t_x) - f_M(t_i)] \times (t-t_x)$$

In a second stage, to cancel the linear component of the phase residual, the reflector M is registered with respect to a common time reference $t_i$.

Nonetheless, after this registration, there is still a constant phase residual, different from one illumination sub-period to another, as illustrated by FIG. 7c, which shows the evolution of the phase residual 721, 722, 723 of each illumination sub-period $P_{i-1}$, $P_i$, $P_{i+1}$ as a function of time after the aforementioned position-wise registration. On completion of this position-wise registration, the phase residual associated with an illumination sub-period $P_x$ is equal to $\phi_{M,ti}(t_x)$. The latter residual term must be canceled.

Hence, in a third stage, for each image $IM\_0_x$ different from $IM\_0_i$—in the example, $IM\_0_{i-1}$ and $IM\_0_{i+1}$—, the following operations are performed: for each pixel G of the image $IM\_0_x$:
- estimate the phase residual term $\hat{\phi}_{M,ti}(t_x)$ as a function of:
  - the knowledge of the pair $(f_M(t_i), D_M(t_i))$ associated with the position of the pixel considered;
  - the measurement of the trajectory of the radar between the instants $t_i$ and $t_x$
- multiply the value assigned to the pixel G by the term exp $(-j \times \hat{\phi}_{M,ti}(t_x))$ Just as for the step of registration in terms of position 431 (FIG. 4), with a view to saving computational resources, it is not indispensable to perform an exact computation of the phase residual term for each pixel. These results may be interpolated linearly on the basis of a restricted number of exact computations done for regularly spaced points of the imaged zone.

Moreover, since the estimation of the phase residual term is based on an imperfect measurement of the trajectory of the radar, there is still, on completion of this step of registration in terms of phase 432, an uncompensated spurious phase residual term. However, the latter spurious term can henceforth be considered to be identical for all the reflectors.

The fourth step 404 (FIG. 4) of the method of coherent combining of images is a superimposing of the images to be combined. After the corrections applied during the third step 403, the residual shift in position may be considered, on completion of this third step 403, as identical for all the imaged reflectors.

In a first stage 441, for each of the images $IM\_0_x$ such that $x \neq i$, this residual shift in position along the Doppler axis 106 and the Distance axis 108, denoted $(\delta f_{x/i}, \delta D_{x/i})$ subsequently, is estimated with respect to the reference image $IM\_0_i$. To estimate $\delta f_{x/i}, \delta D_{x/i}$, a correlation is first performed between the image $IM\_0_i$,—expressed in terms of modulus since the phase information could bias the correlation—and the image $IM\_0_x$, obtained on completion of the third step 403 of the coherent combining of images (FIG. 4) and also expressed in terms of modulus.

The two parameters $\delta f_{x/i}$ and $\delta D_{x/i}$ may be estimated directly by performing a two-dimensional correlation. However, the knowledge of the parameter $\delta f_{x/i}$ alone makes it possible to deduce the value of $\delta D_{x/i}$. In order to limit the computational load, it is hence possible to make do with a one-dimensional correlation along the Doppler axis 106 so as to estimate just $\delta f_{x/i}$. In this case, it is necessary beforehand to average in terms of power the contiguous distance bins so as to degrade the resolution along the Distance axis 108.

The shift $(\delta f_{x/i}, \delta D_{x/i})$ is therefore computed by estimating the position of the spike in correlation between two images $IM\_0_i$ and $IM\_0_x$, $x \neq i$. This estimation can, for example, be performed in the following manner:
- computing, by Fourier transform, the spectrum associated with the image $IM\_0_i$ in terms of modulus;
- computing, by Fourier transform, the spectrum associated with the image $IM\_0_x$ in terms of modulus;
- multiplying the spectrum of $IM\_0_x$ by the conjugate of the spectrum of $IM\_0_i$;
- applying an inverse Fourier transform to the result obtained in the previous step, so as to obtain the inter-correlation function for the two images $IM\_0_x$, $IM\_0_i$;
- locating the position of the correlation spike by searching for the maximum value of the inter-correlation function;
- optionally, refining the position of the correlation spike by local interpolation so as to obtain an accuracy of better than the size of the pixel.

On completion of the step of registration in terms of position 431 (FIG. 4), the images $IM\_0_x$, $x \neq i$ are weighted, in contradistinction to the reference image $IM\_0_i$ which does not undergo the step of registration in terms of position 431. With a view to homogeneity, it is preferable to perform the correlations by considering a weighted reference image $IM\_0_i$.

In a second stage 442, once estimated, the residual shift in position is corrected for each of the images $IM\_0_x$ such that $x \neq i$. For example, this correction step 442 comprises the following sub-steps:
- correcting the shift in Distance, that is to say applying to the whole of the image $IM\_0_x$ a shift equal to $-\delta D_{x/i}$ along the Distance axis, as follows:
  - applying a Fourier transform along the Distance axis, stated otherwise, passing to the so-called "Fast frequency" domain;
  - multiplying by a signal whose phase varies linearly as a function of the "Fast frequency", with a slope proportional to $\delta D_{x/i}$;
  - applying an inverse Fourier transform along the "Fast frequency" axis so as to return to the Distance domain;
- correcting the shift in Doppler, that is to say applying to the whole of the image $IM\_0_x$ a shift equal to $-\delta f_{x/i}$ along the Doppler axis, as follows:
  - applying an inverse Fourier transform along the Doppler axis, stated otherwise, passing to the time domain;
  - multiplying the temporal signal by a signal whose phase varies linearly as a function of time, with a slope proportional to $\delta f_{x/i}$;
  - applying a Fourier transform along the time axis so as to return to the Doppler domain.

The last operation of returning to the Doppler domain by applying a Fourier transform is superfluous in the case of coherent recombining 241 since step 405 of abutting the signals, which follows step 404 of superimposing the images, is performed in the time domain.

In parallel with step 442 of correcting the residual shifts in position, an operation termed "deweighting" of the signals is conducted. Indeed, at this juncture of the processing, the images $IM\_0_x$ such that $x \neq i$, are weighted. Stated otherwise, in the [time-Fast frequency] domain, a signal associated with a perfect point reflector no longer exhibits the same amplitude variation as initially in the unweighted input image (in the case of a Spot radar mode, this initial amplitude is constant).

The causes of the presence of this weighting function are notably the following:
- notably, there exists a phenomenon of "rotation" of the sidelobes in terms of Distance and Doppler, due to the fact that the radar-reflector axis rotates between the instant $t_x$ and the instant $t_i$;
- in the course of the step of registration in terms of phase 432, the phase corrections applied to the image IM_$0_x$ do not identically phase shift the main lobe and the sidelobes associated with one and the same reflector (since the corrective phase applied varies quasi-linearly as a function of Doppler and of Distance).

Hence, in order to take the impact of the abovementioned phenomena into account, the weighting function is computed by applying the registration operations to a "benchmark" synthetic signal reproducing the behavior of a perfect point reflector.

The deweighting step makes it possible to cancel the effect of the weighting function thus computed. This deweighting step is incorporated into the correction of the residual shifts in position 442. It is firstly performed along the "Fast frequency" axis by dividing the signal by the computed weighting function, and then in the same manner along the time axis.

On completion of the deweighting, in the [time-Fast frequency] domain, the signal associated with a perfect point reflector belonging to the imaged zone henceforth exhibits an amplitude variation that is almost identical to that which it possessed initially in the unweighted input image. This amplitude variation is zero in the case of a Spot radar mode.

Figure 8:
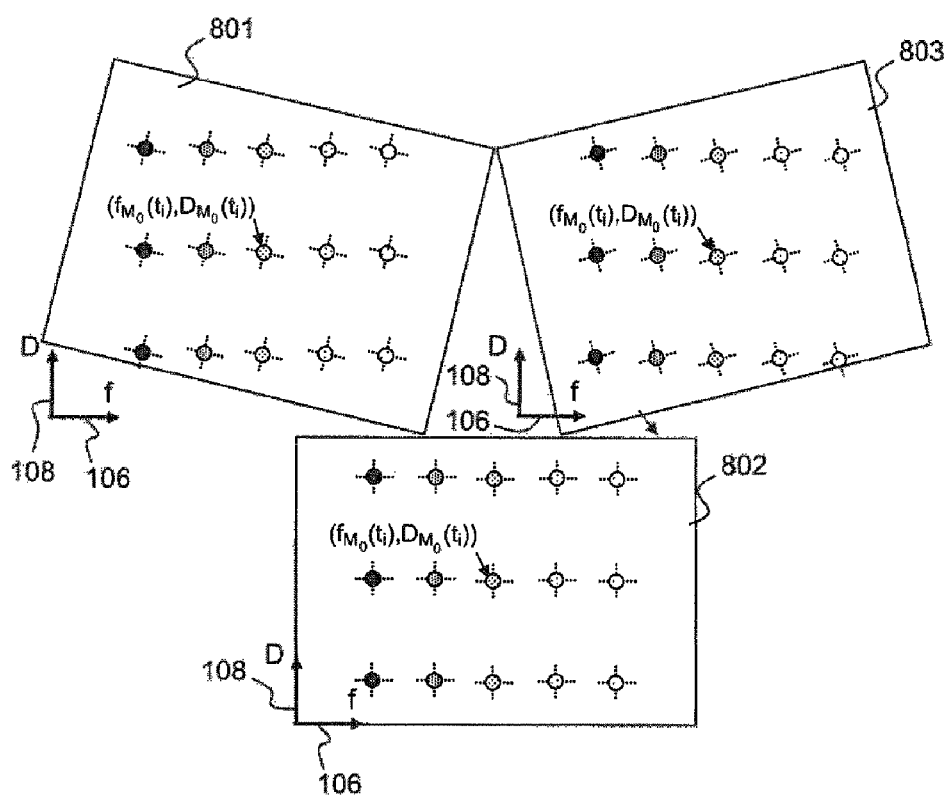
FIG. 8, the three images of FIG. 6 on completion of the execution of a step of superimposing the images in an SAR image construction method according to the invention.

FIG. 8 presents the three images of FIG. 6 on completion of the execution of a step 404 of superimposing the images. At this juncture of the processing, there are therefore three images 801, 802, 803 focused in the Distance-Doppler distance domain exhibiting the following characteristics:
- these images 801, 802, 803 are referenced temporally with respect to one and the same instant, which, in the example, is the central instant t, of the new illumination sub-period of double duration obtained by concatenating the three initial illumination sub-periods $P_{i-1}$, $P_i$, $P_{i+1}$;
- these images 801, 802, 803 are superimposable, consequently:
  - one and the same reflector imaged during the three illumination sub-periods $P_{1-1}$, $P_i$, $P_{i+1}$ is positioned in an identical manner on the three images (if only the main lobe associated with the reflector is considered);
  - the signal arising from one and the same reflector does not exhibit any discontinuity in amplitude from one illumination sub-period to another; if a phase discontinuity persists, it may be considered to be common to the set of imaged reflectors.

The superimposable images 801, 802, 803 are thereafter abutted in the course of the fifth step 405 (FIG. 4) of the coherent combining of images.

The previous operations of registration in terms of position 431 and of registration in terms of phase 432 utilize a measurement of the trajectory of the radar which is by nature imperfect; this error in the knowledge of the Radar-reflectors relative motion in the course of the illumination is the source of residual errors in the thus registered images of the Distance-Doppler domain.

Nonetheless, on the one hand, in the course of the fourth step 404, the residual shifts in position have been estimated by correlations and then corrected so as to obtain superimposable images; on the other hand, the execution of the phase-wise registration step 431 has made it possible to guarantee that the residual discontinuity in phase from one illumination sub-period to another could henceforth be considered to be identical for all the imaged reflectors. For an illumination sub-period $P_x$, x≠i, this residual phase shift common to all the reflectors is denoted $\delta\phi_{x/i}$.

This spurious phase term $\delta\phi_{x/i}$ may be easily estimated by studying in the time domain the signals arising from the two superimposable focused images in the Distance-Doppler domain which are associated with the illumination sub-periods $P_i$ and $P_x$. Indeed, over the temporal portion common to these two illumination sub-periods $P_i$ and $P_x$, the signal arising from one and the same reflector is identical to within a phase shift. This phase shift is precisely equal to $\delta\phi_{x/i}$.

Consequently, $\delta\phi_{x/i}$ can, for example, be computed in the following manner:
- for the sub-period $P_x$, extract the temporal portion common with the sub-period $P_i$, on the temporal signal associated with the focused superimposable image IM_$0_x$ in the [Distance-Doppler] domain. This extraction, denoted $E_x$, is a 2D array in the [Time-Distance] domain;
- for the reference sub-period $P_i$, extract the temporal portion common with the sub-period $P_x$, on the temporal signal associated with the focused superimposable image IM_$0_i$ in the [Distance-Doppler] domain. This extraction is denoted $E_i$;
- multiply term by term $E_x$ and the conjugate of $E_i$. The result is denoted $E_{x/i}$;
- $\delta\phi_{x/i}$ is equal to the phase of the complex number obtained by summing all the terms of $E_{x/i}$.

For the illumination sub-period $P_x$, the correction of the spurious phase term $\delta\phi_{x/i}$ consists simply in multiplying by $\exp(-j.\delta\phi_{x/i})$ the temporal signal associated with the superimposable focused Distance-Doppler image IM_$0_x$.

Since henceforth, there is now no longer any discontinuity either in phase or in amplitude, the temporal signals associated with the three focused superimposable Distance-Doppler images can now be positioned one after another along the time axis, occupying their respective temporal spans. In order to ensure a progressive transition from one illumination sub-period to another, this abutting operation is weighted, as illustrated in FIG. 9.

Indeed, a weighting function along the time axis is applied to each of the temporal signals associated with the three illumination sub-periods $P_{i-1}$, $P_i$, $P_{i+1}$. FIG. 9 presents, by way of example, the evolution of the weighting coefficients 921, 922, 923, each of said coefficients being applied to a signal related to a sub-period $P_x$. In the example, the first coefficient 921 is applied to the signal of the sub-period $P_{i-1}$, the second coefficient 922 is applied to the signal of the sub-period $P_i$, and the third coefficient 923 is applied to the signal of the sub-period $P_{i+1}$, The abutted signal, defined over a duration double that of the initial duration of an illumination sub-period $P_x$, is computed in the following manner:
- on the common temporal portions 901, 902 shared by two consecutive illumination sub-periods $P_x$, $P_{x+1}$, the result signal is equal to the sum of the two weighted signals associated with these two illumination sub-periods, $P_x$, $P_{x+1}$;
- on the temporal portions 911, 912 belonging to a single illumination sub-period $P_x$, the result signal is a copy of the temporal signal associated with this illumination sub-period $P_x$.

The sixth step 406 of the method of coherent combining of images (FIG. 4) makes it possible to generate the Distance- Doppler image resulting from the combining of the initial images IM_$0_x$. A Fourier transform along the time axis is applied to the abutted signal, while taking into account a duration of analysis equal to the duration of the concatenated sub-periods, which, in the example is equal to twice the duration of an initial illumination sub-period $P_x$. The Distance-Doppler image IM_$1_i$ thus generated exhibits the following characteristics:

the size of the Doppler bin is now twice as fine as in the initial images IM_$0_x$;
this image IM_$1_i$ is referenced with respect to the center of the new illumination sub-period of double duration;
the image IM_$1_i$ is unweighted;
the image IM_$1_i$ may exhibit a residual defocusing, the latter nonetheless being tiny, by virtue of the various registration operations already performed with the aim of "suitably" superimposing the three images IM_$0_{i-1}$, IM_$0_i$, IM_$0_{i+1}$ and canceling the phase and amplitude discontinuities between the temporal signals associated with the various illumination sub-periods $P_x$.

Figure 11:
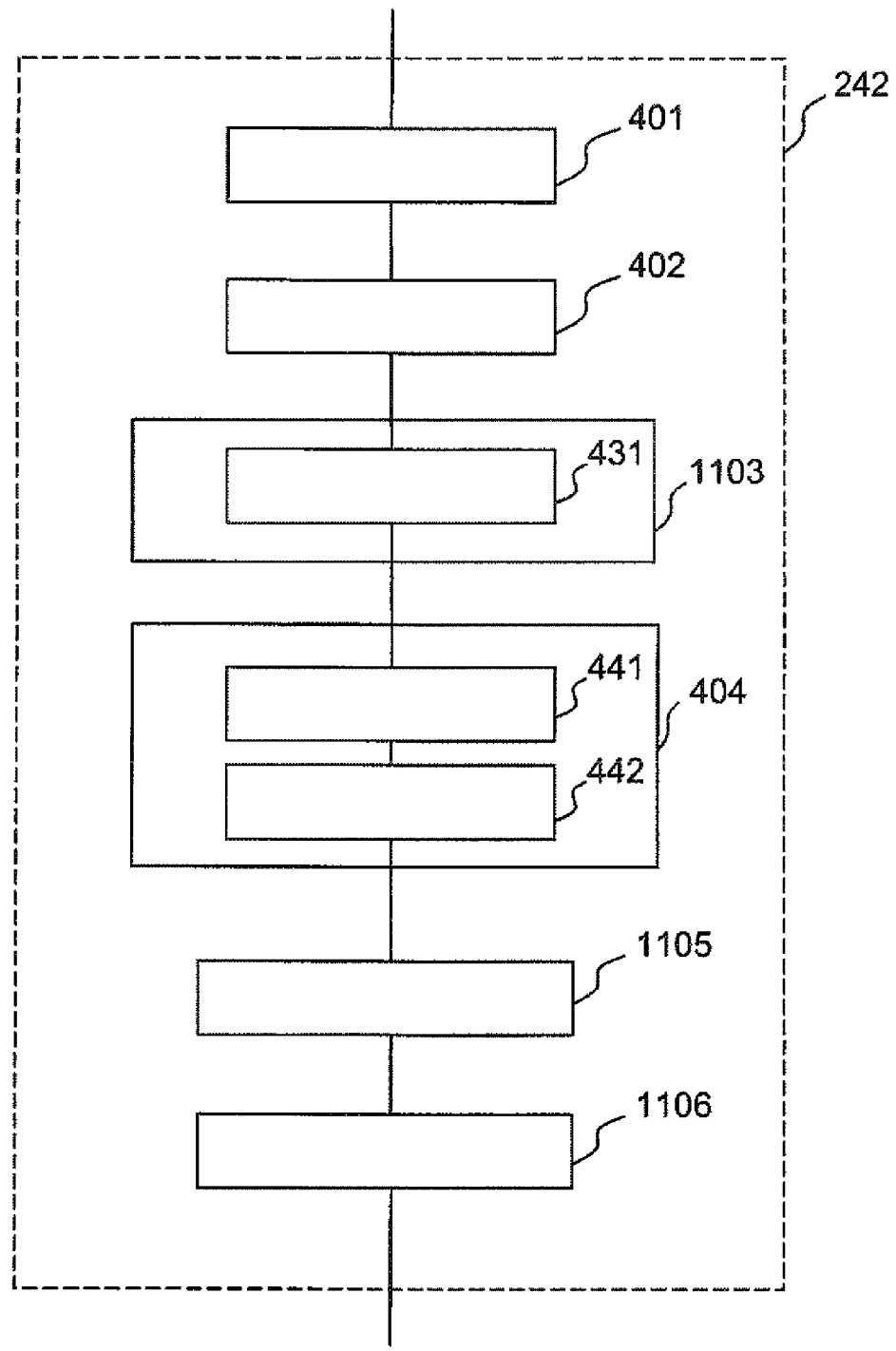
FIG. 11, a schematic specifying the steps to be executed for the non-coherent combining of the images in an SAR image construction method according to the invention.

FIG. 11 presents a schematic detailing the steps to be executed for the non-coherent combining 242 of the images (FIGS. 2b, 2c) in an SAR image construction method according to the invention.

In contradistinction to the steps of coherent combining 241 of the images, non-coherent combining does not make it possible to refine the resolution and ultimately preserves in the output image the initial resolution of the input Distance-Doppler images. On the other hand, chopping into illumination sub-periods 201 makes it possible to carry out an azimuth "multi-view" operation so as to reduce the radiometric noise of the final image and/or to magnify the size of the imaged zone. The non-coherent recombining step 242 comprises the following sub-steps:

choosing the images to be combined, 401;
choosing a reference image 402;
temporally registering the previously chosen images, step referenced 1103;
superimposing the previously registered images, 404;
tailoring the focused superimposable Distance-Doppler images, arising from the previous step 1103, in a common orthonormal frame of reference $\mathfrak{R}(0, \vec{x}, \vec{y}, \vec{z})$, whose origin O corresponds for example to the center of the zone imaged during the complete acquisition, and whose $\vec{z}$ axis is collinear with the vertical at the point O, step referenced 1105;
in the case of a strip or scanning radar mode, spatially weighting the superimposable tailored images so as to take into account the displacement of the ground imprint of the radar beam in the course of the illumination (this spatial weighting operation is irrelevant in the case of a Spot radar mode), step not represented in FIG. 11;
summing in terms of power the superimposable tailored images, step referenced 1106 in FIG. 11.

The first step 401 of choosing the images to be combined, the second step 402 of choosing a reference image 402, and the fourth step 404 of superimposing the images are, in the example, identical to those executed during coherent combining 241 (FIGS. 2a, 2c, 4) of the images.

The third step 1103 of the non-coherent combining 242 differs from the third step 403 (FIG. 4) of the coherent combining of images 241 since the step of registration in terms of phase 432 is not required in the case of non-coherent combining 242.

Moreover, the deweighting operations performed during the correction of the shift in position 442 in the course fourth step 404 (FIG. 4) of the coherent combining of images 241 are optional in the case of non-coherent combining 242. Consequently, according to another implementation of the method according to the invention, this deweighting is not performed.

According to another mode of implementation of the method according to the invention, the tailoring of the images associated with the various illumination sub-periods may be performed directly on the basis of the initial Distance-Doppler images IM_$0_x$ (referenced with respect to different instants), on condition that the corrective terms $\delta f_{x/i}$ and $\delta D_{x/i}$ are taken into account in the tailoring operation itself. This therefore dispenses with the operation of correcting the residual shifts in terms of position in the Distance-Doppler images which are referenced with respect to t, but are not superimposable.

Moreover, in the case of a Spot radar mode, it is possible to begin by summing in terms of power the focused superimposable Distance-Doppler images and thus to tailor just a single multi-view Distance-Doppler image thereafter. Nonetheless, in this case, the tailored final image will be very slightly degraded, since the transformation of a Distance-Doppler image into a tailored image makes it necessary to interpolate the Distance-Doppler image. Now, this interpolation will be of lesser quality on a multi-view Distance-Doppler image providing only modulus information (with no phase information).

According to another mode of implementation of the method according to the invention, when a weighted tailored final image is sought, we begin by summing in terms of power the focused, superimposable and weighted Distance-Doppler images. This therefore dispenses with the operation of deweighting during the correction of the residual shifts in position.

The method according to the invention applies particularly well to the construction of SAR images of high resolution with the help of an aircraft provided with a long-range radar configured to illuminate one and the same zone for a long duration. For example, the method may be advantageously used within the framework of the monitoring of a risk zone. Nonetheless, the method may be used for a large gamut of SAR modes. For example, it is particularly appropriate to the modes comprising at least one of the following characteristics:

SAR modes with long illumination time, for which the quality of measurement of the trajectory of the phase center of the antenna is insufficient to obtain acceptable focusing quality;
SAR modes of high resolution with strong constraints in respect of the obtaining of images;
SAR modes for which an under-resolved image is required before the calculation of the full-resolution image;
multi-view SAR modes, in particular when it is impossible to increase the emitted band to effect distance-wise multi-views, thus rendering azimuth-wise multi-views indispensable.

Moreover, even if the mode presented for the application of the method according to the invention is the Spot mode, the method can also be applied to modes offering coarser resolutions, such as the modes of strip or scanning type, these two modes being more often designated by the respective terms "StripSAR" and "ScanSAR".

The advantages of the method according to the invention are multiple. First of all, it makes it possible to improve the effectiveness and the robustness of the autofocus processing. In contradistinction to conventional techniques which from the outset utilize the whole of the radar illumination, the autofocus processing operations are applied to successive resolutions which are refined progressively in the course of the execution of the method, the first autofocus processing operations being applied over short illumination times. Therefore, the associated defocusing patterns occupy a restricted number of Doppler bins, thereby rendering them easy to estimate and to correct. Moreover, working over short illumination times allows effective estimation of the high-frequency components of the spurious phase error, the components of lower frequencies being estimated in the course of the following iterations, which work over ever longer illumination times. Thus, this "multi-resolution" approach, with a progressive increase in the observation times, enables much finer and more robust estimation of the spurious phase error, since it gradually adapts the observation time to the span of frequencies of the error sought.

Another advantage of the method according to the invention is that it is possible to combine the images arising from the first illumination sub-periods as soon as these first illumination sub-periods have been performed, without waiting for the conclusion of the complete illumination period. In this way, processing operations may be executed in parallel with the collecting of the data by the radar, thereby making it possible notably to optimize the use of the processing resources and to reduce the duration between the end of the acquisition and the end of the computation of the full-resolution image. Furthermore, if the computational power so allows, images of degraded resolution may be available even before the end of the complete illumination, so that early utilization of these images can be accomplished, particularly within the framework of a real-time application. For example, a user of the radar system can, at the earliest, identify a zone of interest in these images at the degraded resolutions, and then designate said zone so as to mobilize the processing resources with a view to more rapidly refining the resolution of the image in this zone.

Moreover, the method according to the invention for constructing a radar image with low radiometric noise naturally incorporates image formation in azimuth multi-view mode. In contradistinction to a conventional method of image formation in azimuth multi-view mode, in which, to incorporate N views, it is generally necessary to construct beforehand an image of resolution N times finer than the desired resolution, the method according to the invention makes it possible to construct an azimuth N-view image without ever computing an image over-resolved by a factor N, thereby, notably, making it possible to decrease the computational load required to execute the method.

The invention claimed is:

1. A method for constructing focused radar images, comprising:
    chopping, using a processing unit of a mobile carrier, a radar illumination period into p sub-periods, two successive sub-periods overlapping temporally;
    choosing, using the processing unit of the mobile carrier, $n_0$ successive sub-periods from among the p sub-periods, and for each of these $n_0$ sub-periods, performing radar acquisitions using a radar fixed to the mobile carrier to generate an image $IM\_0_x$ of resolution $R_0$;
    applying, using the processing unit of the mobile carrier, an autofocus processing to each of the $n_0$ images $IM\_0_x$ generated; and
    combining, using the processing unit of the mobile carrier, the $n_0$ images $IM\_0_x$ processed by autofocus so as to generate at least one new focused radar image $IM\_1_x$.

2. The method according to claim 1, wherein the $n_0$ focused images $IM\_0_x$ are generated on completion of an autofocus processing, wherein applying the autofocus processing and combining the images are repeated iteratively to obtain an image of desired resolution $R_{fin}$, the method further comprising:
    initializing variables $n_i$ and $R_i$ as follows: $n_i = n_0$ and $R_i = R_1$;
    in response to a determination that the resolution $R_i$ is coarser than the desired resolution $R_{fin}$, distributing the $n_i$ images of resolution $R_i$ generated previously, into $n_{i+1}$ sets, each of said sets comprising at least two images, the images following one another temporally;
    for each of the $n_{i+1}$ sets of images of resolution $R_i$:
        combining the images of the set to generate a new image of finer resolution $R_{i+1}$;
        applying an autofocus processing to the new image of finer resolution $R_{i+1}$; and
        updating the variables $n_i$ and $R_i$, $n_{i+1}$ becoming $n_i$ and $R_{i+1}$ becoming $R_i$.

3. The method according to claim 1, further comprising:
    temporally inter-registering the images;
    modifying the inter-registered images to render the inter-registered images superimposable;
    abutting temporal signals corresponding to each of the superimposable images to generate a new signal; and
    applying a Fourier transform on the time axis to said new signal to generate at least one image of resolution $R_1$ finer than $R_0$.

4. The method according to claim 3, wherein a reference image $IM_{ref}$ is chosen from among the $n_0$ images $IM\_0_x$ to be combined, and temporally inter-registering the images comprises:
    for each of $n_0-1$ images $IM_x$ other than the image $IM_{ref}$:
    registering, in terms of position, reflecting points of the image $IM_x$ with respect to reflecting points of the reference image $IM_{ref}$; and
    registering, in terms of phase, the image $IM_x$ with respect to $IM_{ref}$.

5. The method according to claim 4, wherein modifying the registered images so as to render them superimposable comprises:
    for each of the $n_0-1$ images $IM_x$ other than the image $IM_{ref}$:
    estimating a residual shift of $IM_x$ with respect to $IM_{ref}$ which provides an estimate of the position of an inter-correlation spike for these two images $IM_{ref}$ and $IM_x$; and
    correcting the image $IM_x$ by applying thereto an opposite shift to the estimated residual shift.

6. The method according to claim 2, wherein a single geographical zone is illuminated by the radar throughout the duration of the illumination, in which the $n_0$ sub-periods of temporal chopping overlap substantially by half, the sets comprising three images of resolution $R_i$ the resolution $R_{i+1}$ of the image generated based on said three images being substantially twice as fine as the resolution $R_i$.

7. The method according to claim 2, wherein the combining is parallelized, images of resolution $R_a$ grouped together in a first set are combined in parallel with images of resolution $R_b$, $R_b$ being finer than $R_a$, grouped together in a second set, the images of the first set arising from radar acquisitions performed over a period disjoint from the radar acquisitions performed to produce the images of the second set.

8. A method for constructing a radar image with low radiometric noise, the method comprising:
    the steps of the method according to claim 1, wherein combining the $n_0$ images $IM\_0_x$ generated within each of the illumination sub-periods comprises:
    temporally inter-registering the images;
    modifying the inter-registered images to render the inter-registered images superimposable;

tailoring the superimposable images in a common frame of reference; and summing the tailored images to average the tailored images according to power.

9. A method for constructing at least one radar image of high resolution and with low radiometric noise, the method comprising:

the steps of the method according to claim 1, wherein combining the $n_0$ images $IM\_0_x$ generated within each of the illumination sub-periods comprises:

choosing between a first type of combination suitable for forming images of high resolution and a second type of combination suitable for forming images with low radiometric noise;

in response to determination that the second type of combination is chosen:

temporally inter-registering the images;

modifying the inter-registered images to render the inter-registered images superimposable;

tailoring the superimposable images in a common frame of reference; and summing the tailored images to average the tailored images according to power;

in response to determination that the first type of combination is chosen, testing whether the resolution of the images to be combined is coarser than a desired resolution $R_{fin}$;

if the resolution of the images to be combined is coarser than the desired resolution:

initializing variables $n_i$ and $R_i$ as follows: $n_i=n_0$ and $R_i=R_1$;

as long as the resolution $R_i$ is coarser than the desired resolution $R_{fin}$:

distributing the $n_i$ images of resolution $R_i$ generated previously, into $n_{i+1}$ sets, each of said sets comprising at least two images, the images following one another temporally; and for each of the $n_{i+1}$ sets of images of resolution $R_i$:

combining the images of the set to generate a new image of finer resolution $R_{i+1}$;

applying an autofocus processing to the new image of finer resolution $R_{i+1}$; and updating the variables $n_i$ and $R_i$, $n_{i+1}$ becoming $n_i$ and $R_{i+1}$ becoming $R_i$.

* * * * *